Sept. 10, 1929.     C. T. EVANS     1,727,872
MOTOR CONTROLLER
Original Filed Aug. 11, 1923
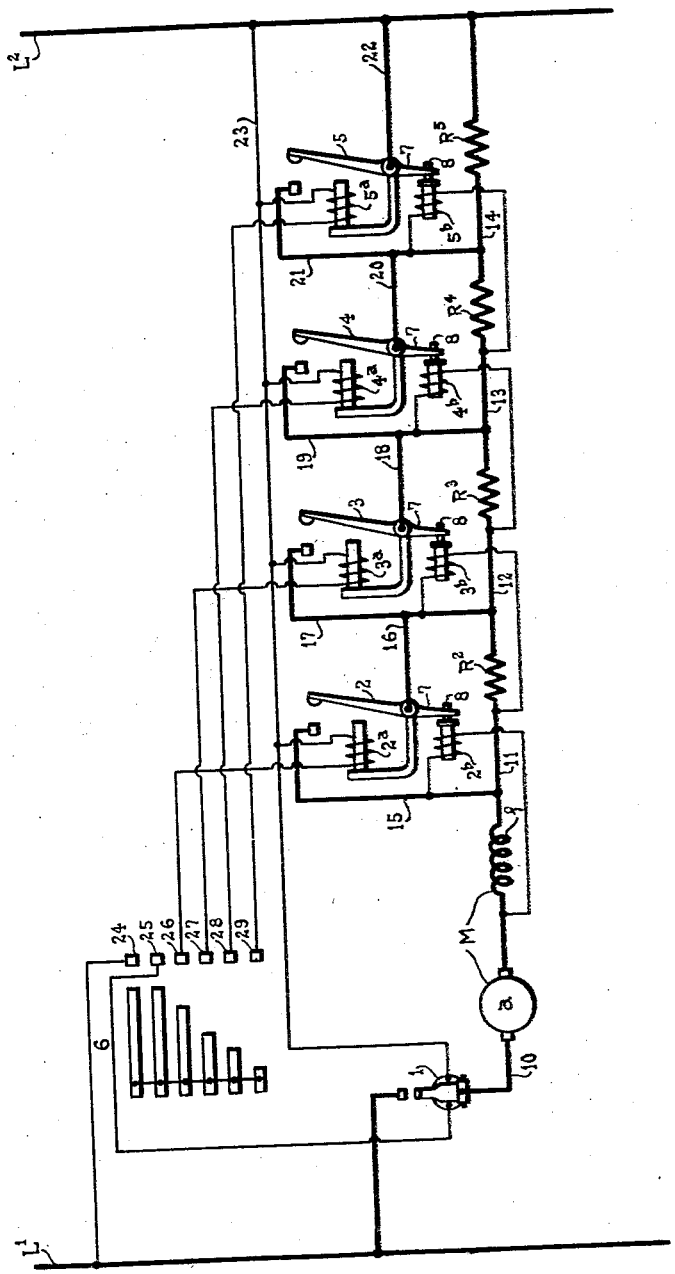
INVENTOR
Clarence T. Evans
BY
Frank H. Hubbard
ATTORNEY Patented Sept. 10, 1929.

1,727,872

UNITED STATES PATENT OFFICE.

CLARENCE T. EVANS, OF WAUWATOSA, WISCONSIN, ASSIGNOR, BY MESNE ASSIGNMENTS, TO CUTLER-HAMMER, INC., OF MILWAUKEE, WISCONSIN, A CORPORATION OF DELAWARE.

MOTOR CONTROLLER.

Application filed August 11, 1923, Serial No. 656,921. Renewed July 27, 1928.

This invention relates to controllers for electric motors and more particularly direct current motors.

In my Patent No. 1,479,033, dated January 1, 1924, there is disclosed a motor controller wherein inherently transient currents are obtained by induction and utilized to effect arrest of the operation of the controller in different stages thereof, the time elements thus afforded being influenced to some extent by the surges in motor current resulting from exclusion of the motor controlling resistances and the present invention relates to motor controllers of this type.

The particular forms of controller illustrated in my patent aforementioned have been found to afford a time element greater than that required in some instances and the present invention has among its objects to provide a simplified controller of the same type which will afford a time element adequate in many instances.

Another object is to preserve the independence of adjustment of the successive time elements which is characteristic of the controller aforementioned.

Another object is to eliminate as in the controller aforementioned the necessity for the interlocking contacts and the more or less complex circuit connections commonly employed to effect progressive operation of the switches involved.

Other objects and advantages of the invention will hereinafter appear.

The accompanying drawing illustrates diagrammatically one embodiment of the present invention which will now be described it being understood that the embodiment illustrated is susceptible of various modifications without departing from the scope of the appended claims.

The controller illustrated includes an electro-magnetic main switch 1 and electro-magnetic accelerating switches 2, 3, 4 and 5, switch 1 being employed to control the continuity of circuit of a motor M and switches 2, 3, 4 and 5 to control respectively starting resistances $R^2$, $R^3$, $R^4$ and $R^5$ connected in series with the motor. The aforementioned switches are provided with shunt operating windings and a master controller 6 is provided to close the circuits of said windings progressively at will or alternatively to close the circuits of said windings substantially simultaneously for response thereof subject only to the automatic control hereinafter described.

The switches 2, 3, 4 and 5 which in practice may assume various different forms, are illustrated as respectively provided with operating windings $2^a$, $3^a$, $4^a$ and $5^a$ and lockout windings $2^b$, $3^b$, $4^b$ and $5^b$, each of said switches having an armature extension 7 carrying an adjustable magnetic plug 8 disposed within the magnetic field of its respective lockout winding. Thus the lockout windings afford means for delaying closure of the accelerating switches but only so long as said windings are supplied with a given current.

The lockout winding $2^b$ of the first accelerating switch 2 is connected across an inductance $f$ which as shown comprises a series field winding for the motor M but which if desired may comprise an additional inductance connected in series with the motor. Thus it will be observed that when the motor circuit is initially closed the inductance $f$ will cause a maximum amount of the motor current to traverse the path including the lockout winding of the first accelerating switch 2 with the result of arresting response of said switch whereas the inductance will thereafter permit a gradually increasing flow of current therethrough with the result of gradually decreasing the current passing through said lockout winding to release switch 2 under predetermined conditions. A given minimum time element is thus provided, such time element being of course influenced to some extent by the magnitude of the surge of current to which the motor is subjected, the time element being increased with an increase in the surge of motor current.

The lockout winding of switch 3 on the other hand is connected across resistance $R^2$ to be short circuited therewith by closure of switch 2. When so short circuited the self induction of the lockout winding maintains it effective for a given minimum period and manifestly the greater the current value at the instant of short circuiting the greater is the time element obtained prior to release of switch 3.

The lockout windings of switches 4 and 5 are connected across resistances $R^3$ and $R^4$ respectively and hence each of these windings through self induction will also function in the same manner as that described to afford a time element incident to release of its respective switch.

From the foregoing it will now be apparent that should the lockout winding of the first accelerating switch 2 be connected between the contacts of main switch 1 to be subjected to the line voltage while said switch is open and to be short circuited thereby when closed the self induction of said winding would likewise maintain effective for a temporary period. Thus should the time element so obtained be sufficient the inductance $f$ if separate from the motor might be omitted. Also it will be apparent that by appropriate design of the windings and appropriate adjustments of the magnetic plugs 8 the time elements for the several switches may be adjusted wholly independently of one another.

It will also be apparent that while the motor M is illustrated as of the series type it might be of the compound type or even of the shunt type, the lockout winding of the first accelerating switch being controlled in one of the other ways above mentioned or in some other preferred manner.

Considering the circuit connections disclosed, closure of switch 1 completes circuit from line L' by conductor 10 through the motor armature $a$ and field winding $f$ by conductor 11 through resistance $R^2$ by conductor 12 through resistance $R^3$ by conductor 13 through resistance $R^4$ by conductor 14 through resistance $R^5$ to line $L^2$. Switch 2 when closed completes circuit from conductor 11 by conductors 15 and 16 to conductor 12 thus short circuiting resistance $R^2$ and the lockout winding $3^b$ of switch 3. Switch 3 when closed completes circuit from conductor 16 by conductors 17 and 18 to conductor 13 thus short circuiting resistance $R^3$ and the lockout winding $4^b$ of switch 4. Switch 4 when closed completes circuit from conductor 18 by conductors 19 and 20 to conductor 14 thus short circuiting resistance $R^4$ and lockout winding $5^b$ of switch 5. Switch 5 when closed completes circuit from conductor 20 by conductors 21 and 22 to line $L^2$ thus short circuiting resistance $R^5$ and connecting the motor directly across the line through switches 2, 3, 4 and 5 in series.

The main switch and accelerating switches have their operating windings connected to line $L^2$ by a common conductor 23 and to line L' through the master controller 6. The controller 6 is shown as of the drum type having contacts 24, 25, 26, 27, 28 and 29 respectively connected to line L' and the windings of switches 1, 2, 3, 4, and 5. Also controller 6 has a series of contact segments to bridge all of the aforementioned contacts, said segments being of varying lengths to engage contacts 25, 26, 27, 28 and 29 in the order named and to disengage the same in a reverse order. Accordingly the switches may be controlled at will either for acceleration or for speed regulation and if the controller be at once operated to full on position the switches will respond progressively under the control of their lockout windings as above explained and without requiring any interlocking contacts or the like. All lockout windings being included in the motor circuit when initially closed they will of course function to restrain their respective switches against response until said windings are individually rendered ineffective as described.

However it is to be understood that if any switch tends to operate prematurely owing to the characteristics of the particular motor involved or from any other cause the same may be interlocked with a preceding switch to insure the proper sequence of operation and it has been found desirable in some instances to interlock the accelerating switches with the main switch. This interlock renders response of all accelerating switches dependent upon prior response of the main switch whereas the provisions described are relied upon to insure proper sequential operation of the accelerating switches.

What I claim as new and desire to secure by Letters Patent is:

1. In a motor controller, in combination, an electro-responsive accelerating switch having a winding in series with the motor armature to restrain said switch against response and means to render said restraining winding ineffective and said switch responsive at any value of the motor current but subject to a delay which is a function of the self induction of said restraining winding.

2. In a motor controller, in combination, a plurality of progressively operable switches including a switch having a single restraining winding to be subjected to current supplied to the motor and connections whereby said restraining winding is excluded from the motor circuit by operation of the switch preceding its respective switch and maintained effective for a temporary period as a function of its self-induction.

3. In a motor controller, in combination, a plurality of resistances for the motor circuit and progressively responsive switches to short circuit said resistances respectively, certain of said switches each having a restraining winding paralleling the resistance to be short circuited by a preceding switch and each of said last mentioned switches being responsive subject to delay only by the self-induction of its restraining winding after operation of its preceding switch.

4. In a motor controller, in combination, a plurality of resistances for inclusion in series with the motor and a plurality of electro-responsive switches to exclude said resistances from circuit progressively, certain of said switches each having a restraining winding paralleling the resistance controlled by its next preceding switch and each of said last mentioned switches being responsive subject to delay only by the self-induction of its restraining winding after operation of its preceding switch.

5. In a motor controller, in combination, a plurality of resistances for inclusion in series with the motor and a plurality of switches to be operated sequentially to short circuit said resistances progressively, said switches having shunt operating windings and each except the first of the sequence having a restraining winding paralleling the resistance to be short circuited by the next preceding switch, each of said restraining windings having a timing action as a function of its self induction.

6. In a controller, in a combination, a plurality of resistance sections for inclusion in circuit with the motor, a plurality of switches operable automatically to short circuit said resistance sections progressively, shunt operating means for the respective switches, certain of said switches each having a single restraining winding in series with the motor armature, and means for short circuiting said restraining windings progressively, each of said windings remaining effective thereafter for a given period as a function of its self-induction.

7. In a motor controller, in combination, a resistance for the motor circuit and means for removing said resistance from circuit subject to a given minimum delay but regardless of the instantaneous value of the motor current, said means including a switch having a restraining winding and means to subject said winding to a given minimum current for prolonged delay and to commutate the connections of said winding for self-inductive action to afford a further delay, said switch being operable automatically and being dependent upon said winding for delay.

8. In a motor controller, in combination, a resistance for the motor circuit and means for removing said resistance from circuit subject to a given minimum delay, said means including a switch having a restraining winding and means to include said winding in the motor circuit for prolonged delay and to commutate the connections of said winding for self-inductive action to afford a further delay, said switch operating to effect exclusion of said resistance subject to restraint only by said winding.

9. In a motor controller, in combination, a plurality of resistances for the motor circuit and means to exclude said resistances from circuit sequentially, said means comprising a control switch for one resistance having a restraining winding in parallel with another of said resistances and said switch being operable automatically subject only to restraint by energization of said winding by the motor current and by self-induction.

10. In combination, a motor, a resistance therefor, means to complete the motor circuit through said resistance and electro-responsive means to exclude said resistance from circuit in steps and to exclude each of certain of said steps of resistance after a temporary delay regardless of the instantaneous value of motor current, said resistance controlling means including inductive means having a plurality of windings and further including switches under control of said windings respectively to be delayed in operation by the self inductive effect of their respective windings, each of said switches being unrestrained against operation when relieved of restraint by its winding aforementioned.

11. The combination with an electric motor, of resistance in circuit therewith, an electroresponsive switch to exclude a portion of said resistance from circuit, and means including a winding connected in parallel with another portion of said resistance and responsive to such winding alone to delay operation of said switch until said second mentioned portion of said resistance is short-circuited, said winding having a self-inductive action effecting a further appreciable delay in operation of said switch.

12. The combination with an electric motor, of resistance in circuit therewith, an electroresponsive switch to exclude a portion of said resistance from circuit, and means to exclude another portion of said resistance from circuit and to delay operation of said switch pending exclusion of the latter portion of said resistance, said means including a winding paralleling the second mentioned portion of resistance and producing a magnetic flux which alone is sufficient to effect the aforementioned delay in operation of said switch, said winding being supplied with motor current only but having a self-inductive action effecting a further substantial delay in operation of said switch.

In witness whereof, I have hereunto subscribed my name.

CLARENCE T. EVANS.